March 21, 1967 R. D. HAWKINS 3,310,809
RECORDING METHOD FOR USE WITH FREQUENCY RESPONSIVE DEVICE
Original Filed April 4, 1962 2 Sheets-Sheet 1
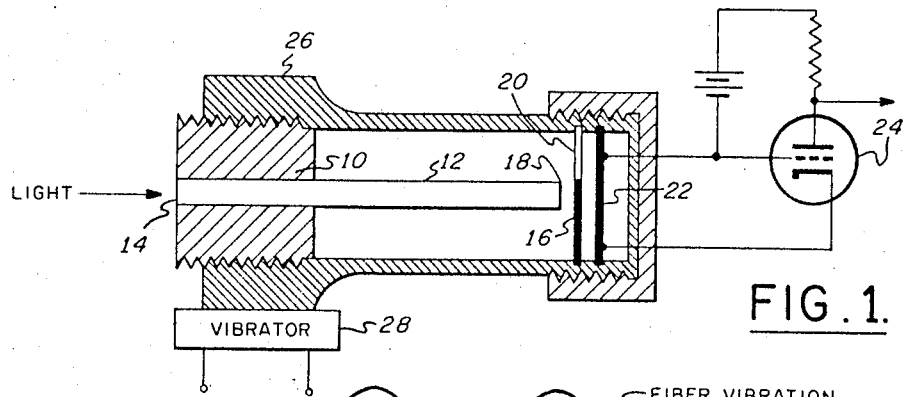
FIG. 1.
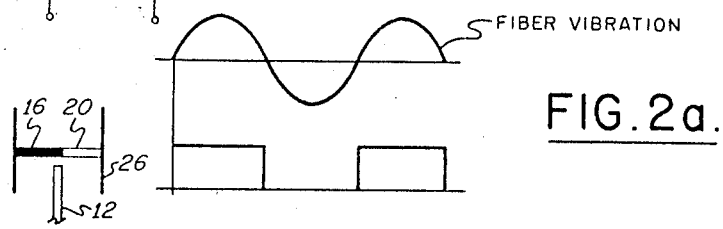
FIG. 2a.
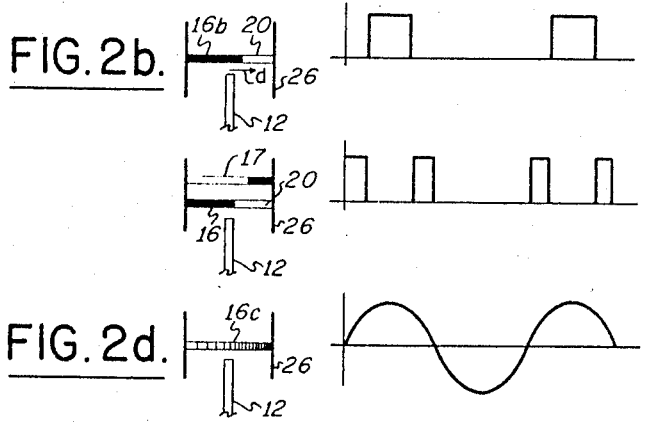
FIG. 2b.
FIG. 2c.
FIG. 2d.
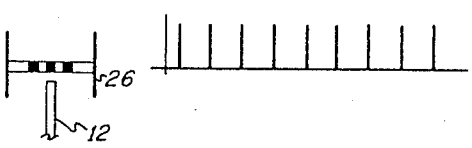
FIG. 2e.
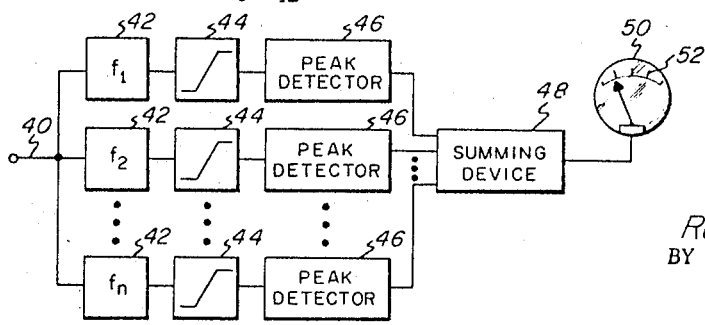
FIG. 3.
INVENTOR.
ROBERT D. HAWKINS
BY
*SC Yeaton*
ATTORNEY March 21, 1967 R. D. HAWKINS 3,310,809
RECORDING METHOD FOR USE WITH FREQUENCY RESPONSIVE DEVICE
Original Filed April 4, 1962 2 Sheets-Sheet 2

INVENTOR.
ROBERT D. HAWKINS
BY
*SC Seaton*
ATTORNEY

United States Patent Office 3,310,809
Patented Mar. 21, 1967

3,310,809
RECORDING METHOD FOR USE WITH FREQUENCY RESPONSIVE DEVICE
Robert D. Hawkins, Greenlawn, N.Y., assignor to Sperry Rand Corporation, a corporation of Delaware
Original application Apr. 4, 1962, Ser. No. 185,064, now Patent No. 3,213,197, dated Oct. 19, 1965. Divided and this application Feb. 2, 1965, Ser. No. 429,736
1 Claim. (Cl. 346—1)

This invention relates to signal responsive apparatus and more particularly to apparatus having particular sensitivity to signals on the order of audio frequencies. This case is a division of copending application S.N. 185,064 entitled, "Frequency Responsive Apparatus," invented by Robert D. Hawkins and filed on Apr. 4, 1962, now Patent No. 3,213,197.

By means of a small light-conducting fiber, photoconductor, and cooperating mask and transparency, a modulating filter may be provided simply. The fiber is secured at one end in an opaque base in such a way that the tip of the secured end is exposed. Light is directed down the fiber to the mask and, when the base is vibrated at the resonant frequency of the fiber, the fiber moves from the shadow of the mask and directs the light through the transparency to the photoconductor. The size of the mask determines the threshold characteristics of the filter since it determines the magnitude of vibration necessary to take the fiber from the aforesaid shadow; the size of the transparency determines the limiting characteristics of the filter since it allows light to strike the photoconductor only when the displacement of the fiber from the mask shadow is small enough to allow light to pass through the transparency. Modulation results by varying the sizes and shapes of the mask and transparency in a manner to be described later.

One aspect of the present invention is that it may be expediently employed for example in sound or other complex multifrequency signal responsive apparatus (which are useful in sound coded equipment and voice operated machinery in general, and the like) the operation of which is based on the following fact:

With the volume, i.e. intensity, of sound (or as the case may be, the intensity of the multifrequency signal) held to a substantially constant level, the various frequency components of a particular sound (or signal) have particular peak amplitudes, the sum of which is also particular; therefore, if a limiter is provided for each of the aforesaid frequency components and set to provide an output signal proportional to the amplitude of its respective component so long as the amplitude of that component is at or below is aforementioned particular peak amplitude, the sum of the output signals from the limiters will have a particular maximum for only the sound (or signal) in question.

A corollary of this fact is that the sum of the time integrals of the limiter output signals is also maximum for the particular sound (or signal) in question. For ease of description, the instant apparatus is described in a sound environment.

One apparatus operating according to the foregoing fact is provided with a multiplicity of tiny fibers of varying lengths, i.e. varying resonant frequencies, which are embedded in an opaque block, each in the manner of the aforementioned filter fiber. Then fiber masks and transparencies are provided for "limiting" purposes as follows: a photographic film is exposed to light passing through the fibers when none is in motion, developed to produce a negative, and then used to mask the light-emitting fiber ends. A second photographic film is laid over the negative and the fibers are set in motion by a suitable vibrator in response to a particular sound. Depending on which, and how much, the fibers vibrate, the second film is exposed to light; by making a positive from the exposed second film, "limiting" transparencies (which are black at their centers and get progressively clearer near the ends) are provided. Now, according to the above fact, maximum light will pass through the transparencies only when the fibers move as they did when the second film was exposed.

A principal object of the invention is to provide a frequency filter.

Another object of the invention is to provide a modulating filter utilizing a light conducting fiber.

Another object of the invention is to provide apparatus that is substantially responsive to only one multifrequency signal.

The invention will be described with reference to the figures wherein:

FIG. 1 is a schematic presentation of a filter embodying the invention;

FIGS. 2a through 2e are diagrams showing how various modifications may be made to the apparatus of FIG. 1;

FIG. 3 is a diagram in block form of a circuit responsive to a particular sound;

Figure 4A:
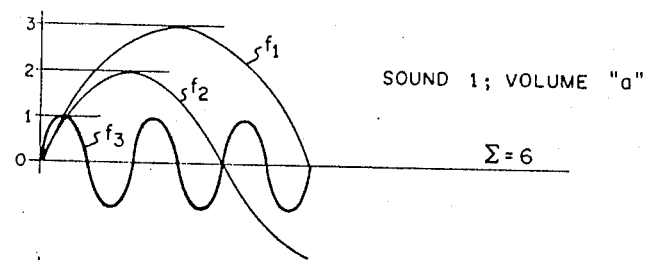
FIGS. 4a, 4b and 4c are diagrams useful in describing the invention.

Referring to FIG. 1, an opaque base 10 supports a light-conducting fiber 12, the end 14 of which is adapted to be exposed to a source of light. The fiber 12 may conduct light by either reflection or refraction, reflection-type fibers being transparent mirror coated strands and refraction-type fibers being transparent strands of very high refractive indices compared to its surrounding medium. Light entering the fiber end 14 emerges at the fiber end 18 and impinges on a mask 16 having, in this form of the invention, an area which causes all light to be blocked whenever the fiber is stationary or bends in a particular direction. The mask 16 is on an otherwise transparent plate 20. A photoconductor 22, the resistance of which decreases when light falling thereon increases, serves to provide cathode resistor bias for a vacuum tube 24. The block 10, plate 20 and photoconductor 22 are contained within an opaque case 26 which in turn is secured to a suitable vibrator 28, e.g. a piezoelectric crystal cut to have a resonant frequency substantially different from the resonant frequency of the fiber which, at least, can produce vibrations at the resonant frequency of the fiber. (If desired, a plurality of differently tuned filters may all be driven simultaneously by the same vibrator.)

When the vibrator 28 vibrates at a frequency other than the resonant frequency of the fiber 12, the fiber remains substantially stationary and has its emitted light blocked by the mask 16. However, when the vibrator 28 vibrates at the resonant frequency of the fiber 12, the fiber is set sympathetically into motion and departs periodically from behind the mask 16, thereby causing light falling on the photoconductor 22 to be modulated at the fiber frequency of vibration. (See FIG. 2a.) As a result the resistance of the photoconductor 22 varies at the frequency of the vibrating fiber and causes the tube 24 to provide an output signal at that frequency.

FIGS. 2b through 2e show the manner and effect of several (but certainly not all) modifications to the light transmission path between the fiber end 18 and the photoconductor 22. In FIG. 2b, a mask 16b (which is somewhat like the mask 16 of FIG. 1, but larger) creates a threshold which must be exceeded by bending the fiber in the direction $d$ before any light can impinge on the photoconductor. In FIG. 2c, a transparency 17 is combined with the mask 16 and, by causing the fiber 12 to vibrate to its extremes, two bursts of light strike the photoconductor 22 every other half cycle of the fiber vibration. FIG. 2d shows a mask 16c that ranges from black at one end to clear at the other which causes the photoconductor resistance to vary sinusoidally when the fiber 12 vibrates. FIG. 2e shows how frequency multiplication may be provided by the mere use of a plurality of masks which "chop" the light emitted by the fiber 12.

Referring to FIG. 3, apparatus adapted to operate according to the aforementioned fact has a signal representative of sound applied from a lead 40 to a plurality of filters 42 to break that signal into its respective frequency components. The filter output signals are applied then to respective limiters 44 and thence to peak detectors 46, e.g. the detector shown and described in the Radiation Laboratory Series, Waveforms, volume XIX, McGraw-Hill Book Company, Inc., New York, page 503. The peak detectors have their output signals applied to a summing device 48, the output signal of which drives the pointer of a meter 50 having an index 52. Each limiter 44 is set to provide an output signal which can never exceed in amplitude the amplitude of its respective frequency component when that component is derived from a particular sound. The index 52 represents the pointer deflection when the signal applied to the lead 40 is representative of the particular sound in question.

FIG. 4a shows only (for ease of description) three components, $f_1$, $f_2$, $f_3$, having respectively amplitudes 3, 2 and 1, of the particular sound for which the limiters 44 are set. The limiter adapted to receive the $f_1$ filter output signal is set to pass any signal having an amplitude less than 3; the limiter adapted to receive the $f_2$ filter output signal is set to pass any signal having an amplitude less than 2, etc. The peak detectors, therefore, respectively produce output signals representing the signal amplitudes 3, 2 and 1. With peak amplitude signals 3, 2 and 1 applied to the summing device 48, an output signal representing the sum 6 is produced which drives the meter 50 pointer accordingly, i.e. whenever the meter has a reading of 6 (which constitutes the index 52), the lead 40 has impressed thereon a signal representing the sound for which the limiters 44 were set.

Figure 4B:
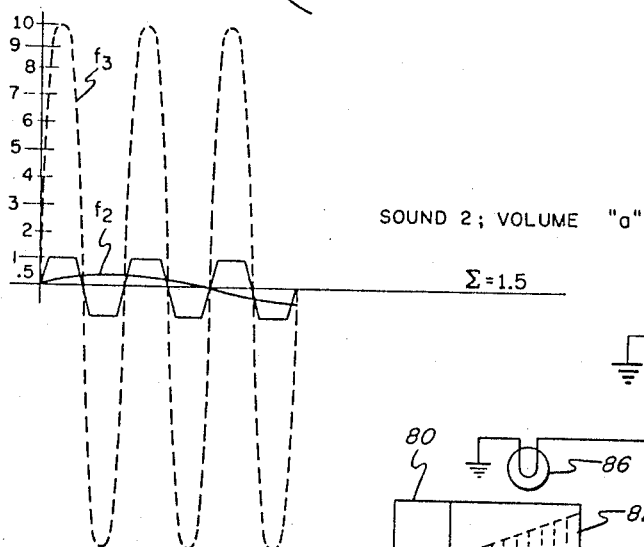

FIG. 4b shows the $f_3$ and $f_2$ frequency components of a different signal represented sound of the same intensity as the sound of FIG. 4a, i.e. the total areas under all frequency components in both cases are equal. The sound of FIG. 4b contains no frequency component $f_1$. As shown, the amplitude of the frequency component $f_2$ is substantially less than the amplitude 2 (which the $f_2$ component of the sound of FIG. 4a had), being only .5, and the amplitude of the frequency components $f_3$ is susbtantially greater than the amplitude 1 (which the $f_3$ component of the sound of FIG. 4a had). Therefore, if a signal representing the sound of FIG. 4b is applied to a device like that shown in FIG. 3, such device being set as above for the sound of FIG. 4a, the frequency component $f_2$ will be allowed to pass through its respective limiter unaltered, but the $f_3$ component will be held to an amplitude of 1 by the action of its respective limiter. As a result, the $f_3$ peak detector detects a peak amplitude of 1 and the $f_2$ peak detector detects an amplitude of .5, the sum of which is substantially less than 6 as occurred in the situation depicted in FIG. 4a.

Figure 5:
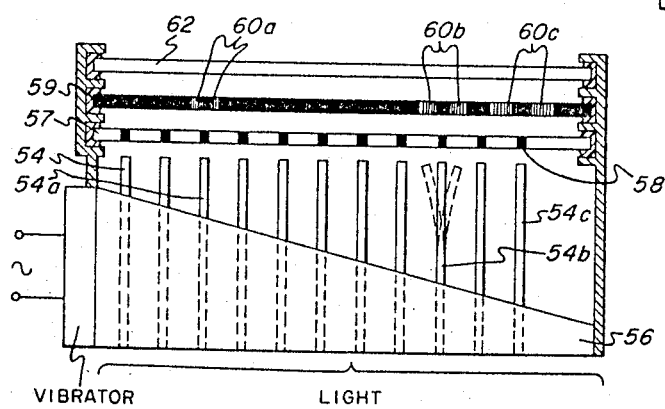
FIG. 5 shows a side view of a presently preferred form of sound-responsive apparatus.

FIG. 5 shows a particular sound responsive device that operates to the foregoing fact corollary, but in an improved way, i.e. instead of providing continual integration, the apparatus of FIG. 5 provides signal component integration only so long as such signals do not have respective amplitude limits exceeded. Fibers, designated by the numeral 54, of varying lengths are supported by an opaque base 56. The ends of the fibers which are supported by the base 56 are adapted to be exposed to a source of light. Masks 58 are provided for each of the fibers and are provided as herebefore mentioned, i.e. by exposing a photographic film to light emanating from the fibers and producing a negative 57 therefrom. Transparencies 60 (a, b, etc.) are also provided by the photographic process herebefore mentioned, i.e. by exciting certain fibers to vibration and making a positive 59 from a photographic film exposed to the light that they emit. A photoconductor 62 is then secured to receive whatever light passes through the transparencies. A broadband vibrator, e.g. a piezoelectric crystal cut to have a resonant frequency well above the highest fiber resonant frequency, is adapted to receive a sound representation signal and accordingly set the base 56 in motion.

With the transparencies 60a, b and c provided respectively for the frequency components $f_3$, $f_2$ and $f_1$ of FIG. 4a, i.e. with the lengths of those transparencies being respectively proportional to amplitudes 1, 2 and 3, the fibers 54a, 54b and 54c, when set into motion, direct light through their respective transparencies to the photoconductor 62. So long as the $f_1$, $f_2$ and $f_3$ signal components have amplitudes less than 3, 2, and 1, all light which gets by the negative 57 reaches the photoconductor 62; that is, peak light reaches the photoconductor 62 whenever the frequency components $f_1$, $f_2$ and $f_3$ all have the amplitudes shown in FIG. 4a, thereby causing the integration of that light to be peak also.

Figure 4C:
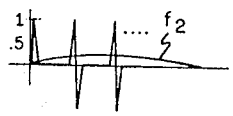

For a sound having the frequency components depicted in FIG. 4b, the light reaching the photoconductor will be proportional to the areas under the curves of FIG. 4c, this being, by inspection, obviously far less than that which reached the photoconductor in the situation described immediately above. The $f_2$ frequency component of FIG. 4b causes the fiber 54a to remain always within the limits of the transparency 60a; the frequency component $f_3$ causes the fiber 54b to be usually outside the limits of its transparency 60b (spending but a short duration within the border of the transparency); the fiber 54c remains stationary and has all its light blocked by its respective mask 58. As a result, all light emitted by the fiber 54a and only a small part of the light emitted from the fiber 54b reaches the photoconductor 62, i.e. the apparatus of FIG. 5 when receiving a signal representing the sound of FIG. 4b has practically no output signal if its masks and transparencies are set for the sound of FIG. 4a.

Figure 6:
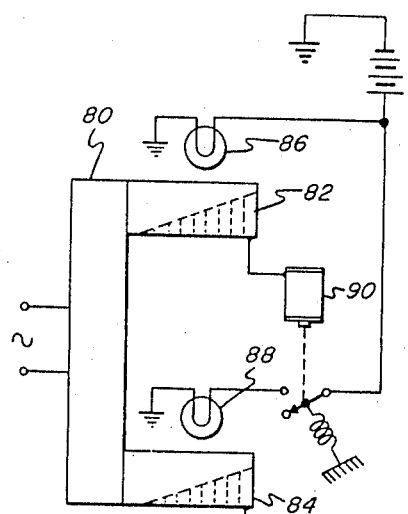
FIG. 6 shows speech recognizing apparatus employing the invention.

FIG. 6 shows a device that produces a substantial output signal only when a signal representative of a particular complex sound, e.g. two syllables, is applied to a broadband vibrator 80. The vibrator 80 has associated therewith two devices 82 and 84, like the device of FIG. 5, which are so cascaded that the device 84 is enabled only when the device 82 provides an output signal, i.e. each device 82 and 84 has its own light source, respectively designated 86 and 88, with the source 88 being energized when the device 82 actuates a relay circuit 90. Only for a particular combination of syllables are both devices 82 and 84 responsive, with the device 84 producing ultimately the output signal mentioned above.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

The method of producing photographically a recording of a pattern representative of a multifrequency signal from an array of light transmitting fibers so supported by a block that each has a different frequency of resonance, consisting of the steps of:

(1) exposing a first light sensitive film to light transmitted from said fibers when said fibers have substantially no vibratory motion, (2) photographically developing said first film, (3) masking a second light sensitive film with said developed first film, (4) vibrating said block in accordance with said multifrequency signal to set certain fibers in motion to cause modulated light to impinge on said second film, and
(5) photographically developing said second film, whereby said two films, when superposed, record pictorially a pattern representative of said multifrequency signal.

References Cited by the Examiner
UNITED STATES PATENTS

| | | | |
|---|---|---|---|
| 2,951,736 | 9/1960 | Black | 346—1 |
| 3,037,123 | 5/1962 | Lewis et al. | 250—217 |
| 3,146,057 | 8/1964 | Rona | 346—108 |

RICHARD B. WILKINSON, *Primary Examiner.*

J. W. HARTARY, *Assistant Examiner.*